United States Patent [19]
Head

[11] Patent Number: 5,409,651
[45] Date of Patent: Apr. 25, 1995

[54] METHOD OF FORMING TUBULAR PARTS

[75] Inventor: Andrew A. Head, Cincinnati, Ohio

[73] Assignee: Atkins & Pearce, Inc., Covington, Ky.

[21] Appl. No.: 132,375

[22] Filed: Oct. 6, 1993

[51] Int. Cl.⁶ .............................................. B29C 67/00
[52] U.S. Cl. .................................... 264/103; 156/148; 156/175; 156/180; 264/136; 264/257
[58] Field of Search ................ 264/103, 136, 257, 324, 264/325; 156/148, 173, 175, 180

[56] References Cited

U.S. PATENT DOCUMENTS

| | | | |
|---|---|---|---|
| 3,442,738 | 5/1969 | Scott et al. | 156/180 X |
| 3,896,206 | 7/1975 | Beaver et al. | 264/325 X |
| 3,962,394 | 6/1976 | Hall | 264/257 X |
| 3,974,012 | 8/1976 | Hogarth | 156/173 X |
| 4,298,562 | 11/1981 | Latty | 264/103 |
| 4,380,483 | 4/1983 | Kliger | 156/180 X |
| 4,380,523 | 4/1983 | Lind et al. | 264/257 |
| 4,389,269 | 6/1983 | Cooper et al. | 156/173 X |
| 4,774,043 | 9/1988 | Beckmann | 264/103 X |
| 4,976,812 | 12/1990 | McConnell et al. | 156/148 |
| 5,013,507 | 5/1991 | Julien et al. | 264/257 X |
| 5,028,464 | 7/1991 | Shigetoh | 156/173 X |
| 5,048,441 | 9/1991 | Quigley | 156/173 X |

*Primary Examiner*—Leo B. Tentoni
*Attorney, Agent, or Firm*—Wood, Herron & Evans

[57] ABSTRACT

A method of forming a tapered tubular part including the steps of: providing tows of filaments, the filaments being adapted to fuse together when subjected to combined heat and pressure; braiding the tows of filaments into a sleeve; providing a tapered mold and a matingly tapered mandrel; sliding the sleeve into the mold and securing the sleeve to the mold; forcing the mandrel into the mold to compress the wall of the sleeve and to stretch the length of the sleeve while applying heat to the mold to fuse the filaments of the sleeve together into a tube; cooling the mold; withdrawing the mandrel from the mold and removing the cooled tube from the mold.

22 Claims, 1 Drawing Sheet

PLACE SLEEVE INTO MOLD

INSERT MANDREL INTO MOLD & HEAT MOLD

COOL MOLD, REMOVE MANDREL & REMOVE FINISHED PART

METHOD OF FORMING TUBULAR PARTS

FIELD OF THE INVENTION

This invention relates generally to the production of composites, and more particularly to a method of forming tubular parts including both straight and curved tubular parts and tubular parts of both circular and non-circular cross-sections, and in particular tapered tubular parts such as golf club shafts, flag poles, sailboat masts and the like.

BACKGROUND OF THE INVENTION

Elongated tubular parts have traditionally been fabricated by employing a tapered, elongated mold in conjunction with a matingly tapered, elongated mandrel. For example, Scott et al U.S. Pat. No. 3,442,738 discloses a method and apparatus for making fiberglass shafts, and specifically fiberglass golf shafts, which involves the feeding of fiberglass threads or slivers between a mold and a tapered mandrel. Beaver et al U.S. Pat. No. 3,896,206 discloses a method for forming and curing a fiber reinforced hollow epoxy shaft wherein the fiber reinforced shaft is initially formed in a tapered mandrel. The assembly is placed in a mold and the mandrel is forced into the mold to compact the fiber reinforced plastic shaft. Hogarth U.S. Pat. No. 3,974,012 discloses apparatus and method for forming tapered tubular shafts. Thermosetting resin sheet material is wound transversely about a core which is surrounded by a shell.

It is also known to use some sort of heat and/or pressure activated bonding material or agent to fuse the raw material together en route to forming the finished article. Some examples are the Scott '738 patent (resin), the Beaver '206 patent (plastic); and the Hogarth '012 patent (thermosetting resin), as well as U.S. Pat. Nos. 3,962,394 to Hall (liquid resin); 4,298,562 to Latty (elastomer or plastomer); 4,380,523 to Lind et al (thermoplastic polymer); 4,389,269 to Cooper et al (resin); 4,774,043 to Beckman (settable plastic); 5,028,464 to Shigetoh (epoxy resin or other thermosetting or thermoplastic resin); and 5,048,441 to Quigley (polymer matrix).

Another method of forming a tubular part involves the use of a braided sleeve which is pulled over a multidiameter tube and impregnated with a settable plastic, after which the plastic hardens to form an article such as a drive shaft for an automobile. Such a technique is disclosed in Beckman U.S. Pat. No. 4,774,043.

In the construction of composite materials generally, numerous different substrate materials have been combined with either one of two matrix materials to form the composite: either thermoplastic matrix material or thermoset matrix material. As is known in the art, the setting of thermoset resins is characterized by cross linking. Upon heating of the thermoset resin it hardens and solidifies. The cure process for thermoset resin is irreversible, i.e., once cross linking has taken place, the curing process is completed and the resin will no longer flow, at least without degrading.

With thermoplastics, application of heat softens the thermoplastic material and enables it to flow. Upon cooling down the material solidifies and sets. Thus, while the curing of thermosets is essentially an irreversible process, thermoplastics can be remelted and reconfigured many times.

Three specific processes which have been employed in the fabrication of composite materials utilizing the thermoset matrix material are resin transfer molding, pultrusion, and "B stage" forming. In resin transfer molding, the substrate material, for example in the form of braid, is surrounded by a mold, and foam material is placed on the interior of the braid substrate. A vacuum assist is used to pump thermoset resin into the braid, and upon heating and curing the foam expands thereby providing compressive force on the braid substrate and urging thermoset matrix against the outer mold.

Pultrusion, similar to extrusion, involves the passing of the yarn substrate material first through a thermoset resin bath. The yarn is then fed into a dye, which includes one or more heated zones. As the yarns exit the end of the dye, the yarns are pulled from the finished end. The process provides low void content (no air bubbles) and good fiber wetting in the bath.

In B stage forming, the substrate and thermoset matrix are first passed through a drying oven to initiate some of the cross linking process to give the material some stability. The substrate and matrix material, normally in sheet form, are laid up into the desired geometry or form, and then covered by a bag. A vacuum is then pulled on the bag while the sheet is autoclaved to effectuate full cure of the material. Tubular parts can also be formed from this process.

The use of thermoset materials as the matrix material in the composite, however, has a number of disadvantages. Thermoset materials are generally relatively expensive. Thermoset materials can also be difficult to handle, requiring layup by hand or expensive machines. In addition, thermoset materials are relatively brittle. Due to the nature of the one-way process, thermoset materials are not reformable. Thus, errors made during forming are not remediable, thus resulting in expensive scrap. Some thermoset materials are environmentally unfriendly in that they do not biodegrade and contain ozone depleting chemicals. Lastly, thermoset materials have a short shelf life. Often such materials must be stored in a refrigerator to arrest advancement of the curing process, as thermoset materials tend to progress to cure on an unrefrigerated shelf. Typically, the materials can be frozen for only about one year.

Thermoplastics, on the other hand, can be remelted and reconfigured. Thermoplastics are often much tougher than thermosets, and in addition have an infinite shelf life. Thermoplastics are also environmentally friendly in comparison to thermosets.

However, the processes traditionally used to form parts from thermosets are not adequate when employing thermoplastics, as these processes cannot provide high enough temperatures and pressures to form parts from thermoplastics. In addition, while substrates with thermoset matrix materials have high "tack", which greatly aids in handling and forming of parts made therefrom, substrate materials made of a thermoplastic matrix material have little tack, thus creating a need for a process which will take this into account. Since a substrate having a thermoplastic matrix generally has insufficient tack, a traditional textile process such as braiding, weaving, etc, is needed to handle the material. However, such a textile process creates what is known as a high bulk factor, which is the ratio of preform thickness to finished part thickness. This high bulk factor results in the fibers of the substrate material being out of plane which greatly reduces the strength and stiffness of parts made therefrom.

In summary, there is a need for a process to form composite materials generally and tubular parts specifically from a substrate material in combination with a thermoplastic matrix material, rather than a thermoset matrix, since thermoplastics have many more advantages than do thermosets. However, current molding processes utilized in the forming of parts from the combination of substrate with thermoset matrix cannot provide the higher pressures and higher temperatures required for, nor account for the lack of tack, high bulk and unusual geometries characteristic of, the fabrication of parts utilizing thermoplastic matrix material.

SUMMARY OF THE INVENTION

It has been an objective of the present invention to provide a new method of making composite parts, utilizing thermoplastics as the matrix material.

It has been another objective of the present invention to provide a new method of making rigid tubular parts which can provide the high pressures and high temperatures required for, and account for lack of tack, high bulk and unusual geometries characteristic of, the forming of composite parts from substrates employing thermoplastic matrix material.

In accordance with the objective of the present invention and a preferred embodiment thereof, there is provided a method of forming a tapered tubular part comprising the steps of: providing tows of filaments, the filaments being adapted to fuse together when subjected to combined heat and pressure; braiding the tows of filaments into a sleeve; providing a tapered mold and a matingly tapered mandrel; placing the sleeve in the mold; forcing the mandrel into the mold to radially compress the wall of the sleeve while simultaneously stretching the length of the sleeve and applying heat to the mold to fuse or integrate the filaments of the sleeve together into a tube; cooling the tube; withdrawing the mandrel from the mold and removing the cooled tube from the mold.

The tows of filaments which are braided into the sleeve are comprised of a reinforcement substrate material and a thermoplastic matrix material. Many thermoplastic matrix materials can be utilized, such as nylons, thermoplastic polyesters, polypropylenes, polyethelenes and others. Similarly, many reinforcement substrate materials can be utilized such as carbon, glass, boron, ceramic, Kevlar (and all Aramid fibers), cotton, wool, steel mesh and others. With carbon selected as the substrate material and nylon selected as the matrix material, the tows of filaments may be one of at least five types: a carbon nylon co-mingle tow, a carbon nylon co-twist tow, a carbon nylon co-wind tow, an all carbon tow or an all nylon tow. With respect to any of the tows which include nylon, the nylon itself provides the fusing capability when subjected to combined heat and pressure. Should the tows be formed entirely of carbon, the carbon filaments of the tows are preferably predusted with a powdered thermoplastic resin, the predusted tow being known as powdered tow preg, such that, when the tows are subjected to combined heat and pressure, the powdered resin flows so as to fuse or adhere the filaments together.

The braided sleeve utilized in the method of the present invention is preferably a biaxial braid, in an over 1 under 1 diamond braid pattern. Alternatively, the biaxial braided sleeve could be an over 2 under 2 regular braid pattern, or any other regular or fancy bi-axial or tri-axial braid weave pattern.

The method of forming tubular parts according to the present invention provides the advantage of superior physical properties in terms of structural stiffness due to the compressing and tensioning forces applied to the sleeve by the mold and mandrel, coupled with the resulting filament orientation of the braid. The process provides a resulting product which has better physical properties when compared to other conventional molding processes.

Other advantages flowing from the process of the present invention are that thermoplastic matrix materials can be employed in the forming of composite parts, which matrix materials have many advantages over traditional thermoset matrix materials. For example, manufacturers can capitalize on the fact that thermoplastic materials can be remelted and reconfigured, are environmentally friendly, have infinite shelf life, and are very tough. In addition, the process of the present invention provides the higher temperatures and pressures which are required to form composite materials from substrates employing thermoplastic resin. Furthermore, the process of the present invention overcomes the problem of bulkiness of the braided material as discussed above, by stretching and straightening the fibers to bring them into a more in plane relationship thereby increasing strength and stiffness.

These and other objects and advantages of the present invention will become more readily apparent during the following detailed description taken in conjunction with the drawings herein, in which:

DETAILED DESCRIPTION OF THE INVENTION

Figures 1, 1A, 1B:
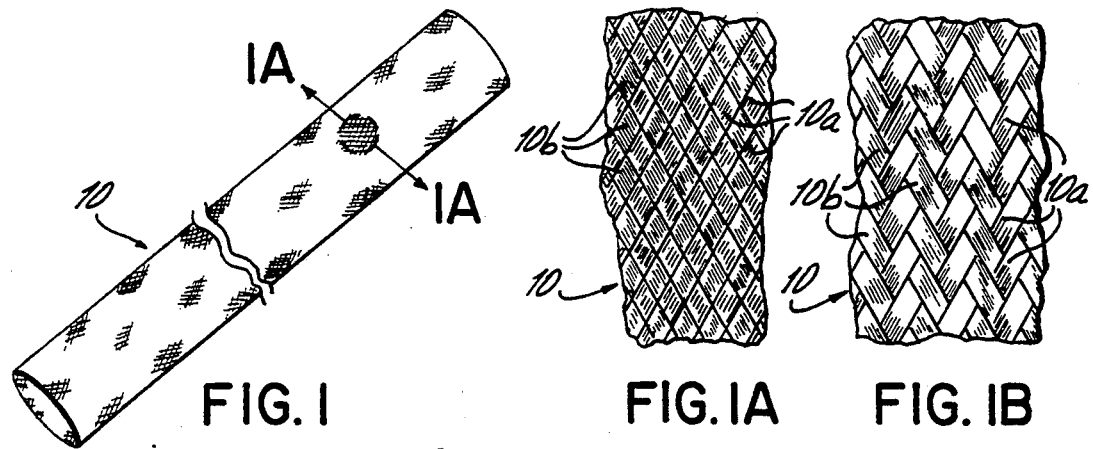
FIG. 1 is a perspective view of the braided sleeve employed in the method of the present invention.
FIG. 1A is the area from FIG. 1, greatly enlarged, illustrating the braided sleeve which is an over 1 under 1 diamond biaxial braid.
FIG. 1B is a view similar to FIG. 1A but illustrating the braided sleeve as an over 2 under two 2 regular biaxial braid.

With reference to the drawings, the method of the present invention is illustrated. In FIG. 1, it will be seen that tows of filaments are braided into a sleeve 10. As best seen in FIGS. 1A and. 1B, the braided sleeve can either be an over 1 under 1 diamond bi-axial braid pattern, as is illustrated in FIG. 1A, or an over 2 under 2 regular bi-axial braid pattern as is illustrated in FIG. 1B. While the diamond braid pattern of FIG. 1A is preferrable, the regular braid pattern of FIG. 1B can be employed in the practice of the present invention, as could other bi-axial braid patterns.

More particularly, in the diamond braid pattern of FIG. 1A, a plurality of tows or bundles of filaments 10a extend in a first direction, while a second plurality of tows 10b extend in a second direction. Each tow 10a travels over and under a single 10b tow, while each 10b tow similarly travels over and under a single 10a tow to form the diamond braid pattern. In contrast, in the FIG. 1B regular braid pattern,, each 10a tow travels over and under two 10b tows, while each 10b tow similarly travels over and under two 10a tows.

The tows or bundles 10a, 10b can be comprised of all reinforcement substrate material, all thermoplastic matrix material, or a combination of reinforcement substrate material and thermoplastic matrix material. For example, the tows 10a, 10b can be all carbon filaments, a combination of carbon and nylon filaments, or all nylon filaments. With respect to the carbon nylon filament tows, these tows can be either a carbon nylon co-mingle, a carbon nylon co-twist or a carbon nylon co-wind. It is contemplated that other tow compositions may be identified which would demonstrate the needed capacity to fuse under heat and pressure to integrate into a rigid, unitary tube. Many other thermoplastic matrix materials, other than nylon, could be substrate material and thermoplastic matrix material. For example, the tows 10a, 10b can be all utilized in the practice of the present invention, such as thermoplastic polyesters, polypropylenes, polyethylenes, and others. In addition, many other reinforcement substrate materials could be employed in the practice of the present invention in addition to carbon, for example, glass, boron, ceramic, Kevlar (and all aramid fibers), cotton, wool, steel mesh and others.

With respect to the carbon nylon co-mingle tows, the preferred tow makeup of the present invention, a preferrable co-mingle tow is that purchased from BASF Part No. 12KC G30500/nylon6, finish: A. The co-mingle process is a process that BASF employs to intimately combine the carbon and nylon filaments together.

The carbon nylon co-twisted and co-wound tows are produced by the assignee of the present invention. The former are twisted together with a twisting machine, known to those skilled in the art, while the latter are wound together with a winding machine again known to those skilled in the art. The makeup of the carbon nylon co-twist or co-wind tows can be any one of a number of combinations. For example, one tow makeup comprises 6,000 filaments of carbon ("6K carbon") together with either four ends (an "end" being a bundle of about 200 filaments) of 200 denier nylon or two ends of 430 denier nylon.

Alternatively, the tow could consist entirely of nylon filaments, which would be braided into a nylon sleeve. The sleeve would then be placed between layers of all carbon sleeves before placement into a mold, the specifics of which will be subsequently described.

In all of the above tow makeups wherein nylon is a component filament of the tow makeup, the nylon filaments themselves act as the fusing agent or element during the practice of the method of the present invention, the steps for which will be subsequently described in more detail.

In addition, the tows can be made up entirely of all carbon fibers, for example 6K or 12K carbon tows. In this instance, in the absence of nylon as the fusing or bonding agent, the carbon tows must be predusted with a powdered resin which serves as the bonding agent. One such powder resin used to predust the carbon filaments, a resulting tow from which is known as "powdered tow preg", is nylon purchased from Custom Composite Materials, Inc.

Further, the methodology of the present invention could as well be carried out with tows made up entirely of all carbon fibers, with a thermoplastic matrix film, for example, a sleeve, placed over the substrate braided sleeve.

Figure 2A:
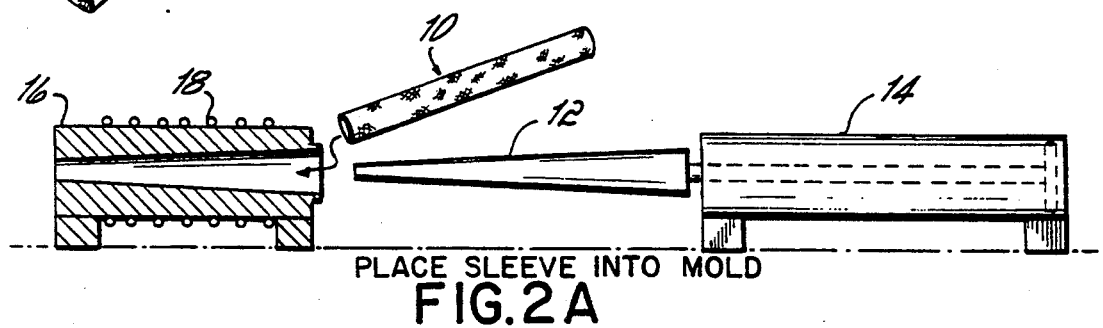
FIG. 2A illustrates the mold and mandrel of the present invention and the step of placing the braided sleeve into the mold.
Figure 2B:
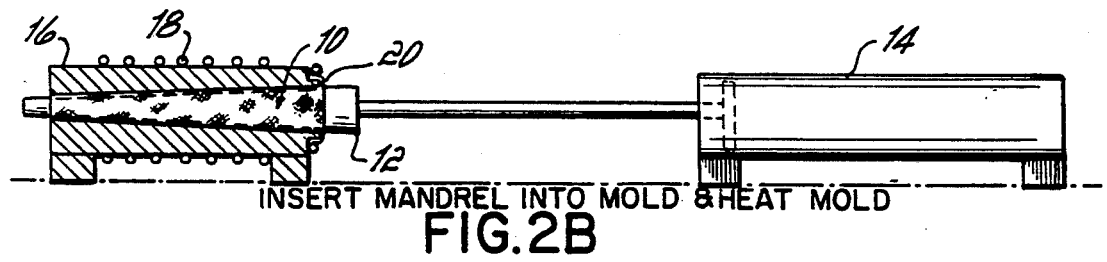
FIG. 2B illustrates the step of inserting the mandrel into the mold with sleeve therein and applying heat to the mold while applying ramming force to the mandrel.
Figure 2C:
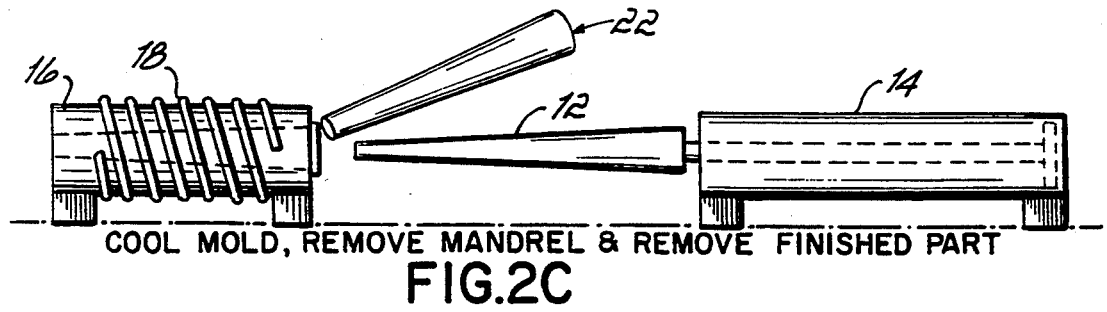
FIG. 2C illustrates the step of cooling the mold, removing the mandrel from the mold and the sleeve, as the finished tubular part, from the mold.
Figure 3:
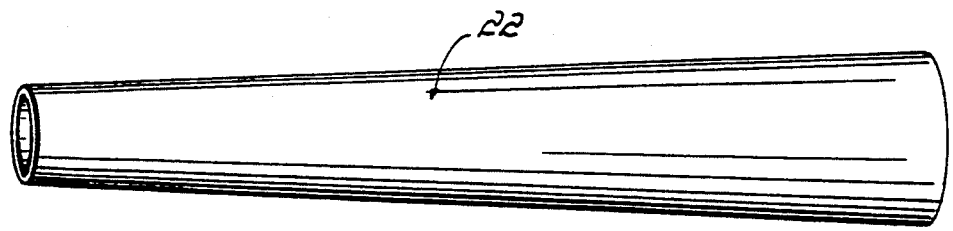
FIG. 3 illustrates the formed tubular part from the sleeve.

Referring now to FIGS. 2A–C, the balance of the steps in carrying out the method according to the present invention will be described. In FIG. 2A, there is provided a ramming mandrel 12 which is actuatable by a pneumatic or hydraulic cylinder 14. The ramming mandrel 12 tapers from a larger diameter to a smaller diameter toward its forward tip. A matingly tapered mold 16 is provided for receiving the mandrel 12. The mold 16 includes a heating element 18 for heating of the mold and hence sleeve 10. The sleeve 10 is placed in the mold 16, and is secured with a collar 20.

In FIG. 2B, current is supplied to the heating element 18 in order to heat the mold 16. The air cylinder 14 forces the mandrel 12 into the mold 16 with sleeve secured therein. The action of the mandrel 12 in the mold 16 compresses the wall of the sleeve 10 while stretching the length of the sleeve 10. The heat from the element 18 causes the thermoplastic matrix material to flow and fuse the reinforcement substrate material together. The degree of heat and pressure depend on the nature of the thermoplastic matrix material, the degree of elongation or stretch, and the nature of the braid; too little heat and/or pressure does not provide sufficient fusion to integrate the thermoplastic matrix material with the reinforcement substrate material while toe, much heat can degrade the thermoplastic matrix material. The optimum can be determined by simple comparison tests.

FIG. 2C illustrates the step of allowing the mold 16 to cool by removing the current from heating element 18. After the mold 16, mandrel 12 and sleeve 10 have cooled, the mandrel 12 is removed from the mold 16 and the resulting finished part 22 is removed from the mold 16.

By way of example, two tubular parts formed according to the practice of the present invention are the following. The first tubular specimen was 9.5 in. long, with outer diameters of 1¼ in. and ⅞ in. respectively. The second specimen was 7.75 in. long and had outer diameters of 0.3 in. and 0.25 in. respectively. The air cylinder employed an axial pressure of 60 psi with a 4 in. diameter cylinder, resulting in a ramming force of approximately 750 pounds and a molding pressure of approximately 1900 psi, in the case of the larger specimen. The molding pressure, while not determined empirically, was approximated using analytical methods. The mold developed a temperature of 560° F. The step of inserting the mandrel into the mold and forcing the mandrel into the mold was for a duration of approximately 10 min., with the overall process from inserting the mandrel with sleeve into the mold to removing the mandrel and the finished part from the mandrel taking approximately 30–45 min. For both specimens the air cylinder was left on to force the mandrel with sleeve thereon into the mold during the cooling portion of the step.

It is believed that ramming force on the mandrel exerts axial tension on the tows, thereby stretching them, and at the same time compresses and molds or "works+ the tows radially (transversely). The bulk of the braided sleeve is thereby greatly reduced, bringing the fibers of the sleeve into a planar relationship. The heat and pressure soften the tows to the point of tackiness and/or activate the pre-preg; this brings the filaments of the tows into more intimate contact and causes them to fuse into an integral body. Upon cooling, the tube rigidifies. Whereas the braided sleeve was rough, flexible and soft, cooled tube is smooth, rigid and hard. It is eminently suited for such uses as golf clubs, masts and flagpoles.

In order to aid in compressing the wall of the sleeve and working and stretching the sleeve during the step of forcing the mandrel with sleeve thereon into the mold, the entire assembly of mandrel and mold can be mounted on a support, for example a beam, with a vibrator likewise mounted on the beam to aid in the mandrel compressing and stretching the sleeve while it is being heated.

Those skilled in the art will readily recognize numerous adaptations and modifications which can be made of the present invention and which will result in an improved method of forming tubular parts, yet all of which will fall within the spirit and scope of the present invention as defined in the following claims. Accordingly, the invention is to be limited only by the scope of the following and their equivalents.

What is claimed is:

1. A method of forming a tubular part comprising the steps of:
   providing tows of filaments, the filaments being adapted to fuse together when subjected to combined heat and pressure;
   braiding the tows of filaments into a sleeve;
   compressing the wall of the sleeve while stretching the length of the sleeve and while heating the sleeve to fuse the filaments of the sleeve together into a tube; and
   cooling the tube.

2. A method of forming a tubular part comprising the steps of:
   providing tows of filaments, the filaments being adapted to fuse together when subjected to combined heat and pressure;
   braiding the tows of filaments into a sleeve;
   providing a mold and a mandrel;
   placing the sleeve between the mold and the mandrel;
   forcing the mandrel into the mold compressing the wall of the sleeve while stretching the sleeve lengthwise and while heating the sleeve to fuse the filaments together into a tube;
   cooling the tube; and
   removing the cooled tube from between the mold and mandrel.

3. A method of forming a tapered tubular part comprising the steps of:
   providing tows of filaments, the filaments being adapted to fuse together when subjected to combined heat and pressure;
   braiding the tows of filaments into a sleeve;
   providing a tapered mold and a matingly tapered mandrel;
   sliding the sleeve into the mold and securing the sleeve to the mold;
   forcing the mandrel into the mold to compress the wall of the sleeve while stretching the length of the sleeve and while heating the mold to fuse the filaments of the sleeve together into a tube;
   cooling the mold; and
   withdrawing the mandrel from the mold and removing the cooled tube from the mold.

4. The method of claim 3 wherein said tows of filaments are a carbon nylon co-mingle.

5. The method of claim 3 wherein said tows of filaments are a carbon nylon co-twist.

6. The method of claim 3 wherein said tows of filaments are a carbon nylon co-wind.

7. The method of claim 3 wherein said tows of filaments are carbon.

8. The method of claim 3 wherein said tows of filaments are nylon.

9. The method of claim 7 wherein said tows of filaments are powdered tow preg.

10. The method of claim 3 wherein said braided sleeve is a bi-axial braid.

11. The method of claim 10 wherein said bi-axial braided sleeve is an over 1 under 1 diamond braid pattern.

12. The method of claim 10 wherein said bi-axial braided sleeve is an over 2 under 2 regular braid pattern.

13. A method of forming a composite part comprising the steps of:
    providing a reinforcement substrate in the form of an elongated braided sleeve;
    providing a thermoplastic matrix;
    applying the thermoplastic matrix to the reinforcement substrate sleeve;
    compressing the thickness of the sleeve along substantially its entire length while stretching the length of the sleeve and while heating the sleeve to fuse the braided sleeve together into a rigid part; and
    cooling the part.

14. A method of forming a composite tubular part comprising the steps of:
    providing a reinforcement substrate in the form of an elongated braided sleeve;
    providing a thermoplastic matrix;
    applying the thermoplastic matrix to the reinforcement substrate sleeve;
    providing an elongated mold and an elongated mandrel;
    placing the sleeve between the mold and the mandrel;
    forcing the mandrel axially into the mold compressing the thickness while stretching the length of the sleeve and while heating the sleeve to fuse the sleeve into a tube;
    cooling the tube; and
    removing the cooled tube from between the mold and mandrel.

15. A method of forming a tapered tubular part comprising the steps of:
    providing tows of filaments, the filaments being adapted to fuse together when subjected to combined heat and pressure;
    braiding the tows of filaments into an elongated sleeve;
    providing a tapered, elongated mold having first and second ends, the first end having an opening larger than an opening of the second end;
    providing a matingly tapered, elongated mandrel having first and second ends, the second end being smaller than the first end;
    introducing the sleeve into the mold and securing the sleeve to the mold;
    introducing the second end of the mandrel into the sleeve and the first end of the mold;
    sliding the mandrel into the sleeve and the mold;

forcing the mandrel into the mold to compress the wall of the sleeve between the mold and mandrel while stretching the sleeve lengthwise and while heating the mold to fuse the filaments of the sleeve together into a tube;

cooling the mold;

withdrawing the mandrel from the mold; and removing the cooled tube from the mold.

16. The method of claim 15 wherein the sleeve has first and second ends and further comprising the steps of:

introducing the second end of the sleeve into the first end of the mold;

sliding the sleeve into the mold; and securing the first end of the sleeve to the first end of the mold.

17. The method of claim 16 wherein the step of stretching the length of the sleeve occurs by virtue of the mandrel forcing the sleeve toward the second end of the mold away from the first end of the mold to which is attached the first end of the sleeve.

18. The method of claim 15 wherein the mold and mandrel have circular cross-sections.

19. A method of forming a tapered tubular part comprising the steps of:

providing an elongated sleeve fabricated from tows of filaments which are adapted to fuse together when subjected to combined heat and pressure;

braiding the tows of filaments into an elongated sleeve;

providing a tapered, elongated mold having first and second ends, the first end having an opening larger than an opening of the second end;

providing a matingly tapered, elongated mandrel having first and second ends, the second end being smaller than the first end;

introducing the sleeve into the mold and securing the sleeve to the mold;

introducing the second end of the mandrel into the sleeve and the first end of the mold;

sliding the mandrel into the sleeve and the mold;

forcing the mandrel into the mold to compress the wall of the sleeve between the mold and mandrel while stretching the length of the sleeve and while heating the mold to fuse the filaments of the sleeve together into a tube;

cooling the mold; and withdrawing the mandrel from the mold and removing the cooled tube from the mold.

20. The method of claim 19 wherein the sleeve has first and second ends and further comprising the steps of:

introducing the second end of the sleeve into the first end of the mold;

sliding the sleeve into; the mold; and securing the first end of the sleeve to the first end of the mold.

21. The method of claim 20 wherein the step of stretching the length of the sleeve occurs by virtue of the mandrel forcing the sleeve toward the second end of the mold away from the first end of the mold to which is attached the first end of the sleeve.

22. The method of claim 19 wherein the mold and mandrel have circular cross-sections.

* * * * *